Sept. 3, 1929.  E. S. LAWSON  1,726,624
WELDING TONGS
Filed May 15, 1928
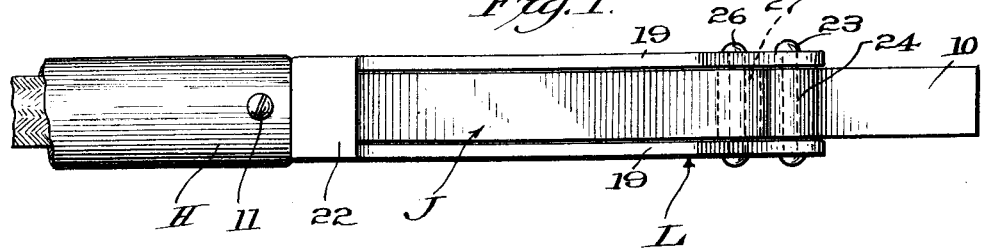
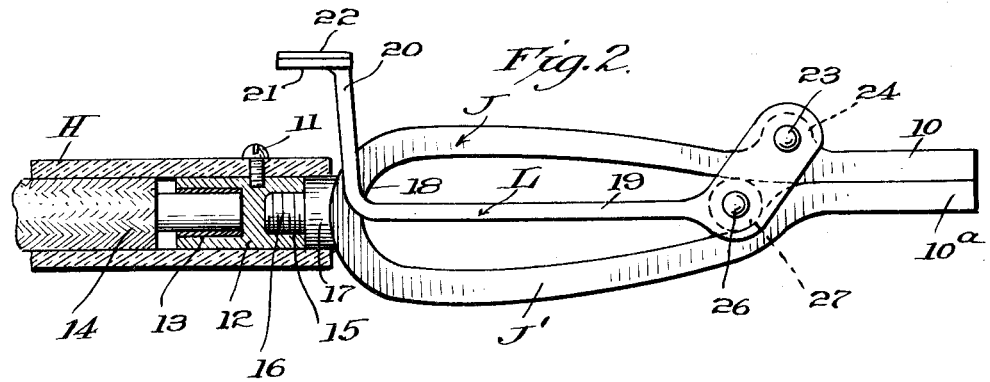
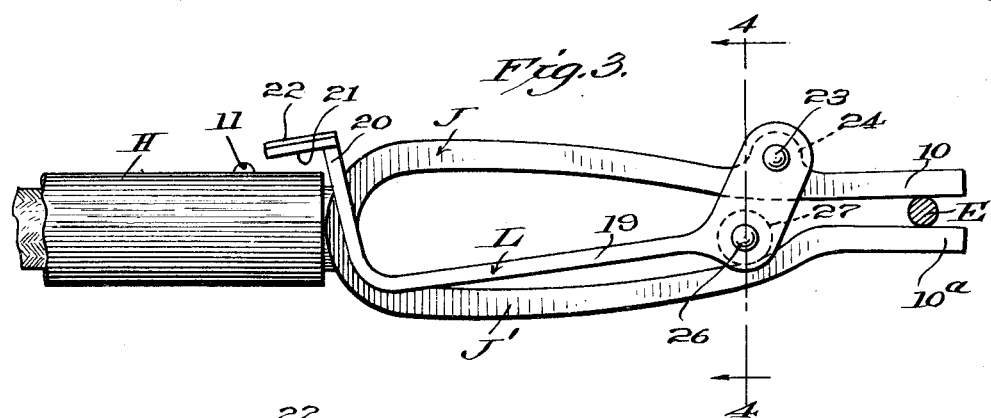
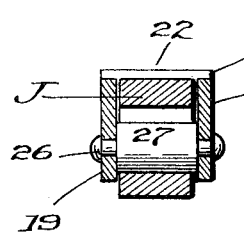
INVENTOR
Ernest S. Lawson
Munn & Co.
ATTORNEY Patented Sept. 3, 1929.

1,726,624

UNITED STATES PATENT OFFICE.

ERNEST S. LAWSON, OF LOS ANGELES, CALIFORNIA.

WELDING TONGS.

Application filed May 15, 1928. Serial No. 277,977.

My invention relates to and has for its purpose the provision of a tongs particularly adapted, although not necessarily, for use in the electric welding art, and characterized by its structural simplicity, durability, cheapness of manufacture, and ease of manipulation by an operator to firmly grip electrodes of different sizes or release the electrodes at will, to the end that welding operations will be greatly facilitated.

I will describe only one form of welding tongs embodying my invention and will then point out the novel features in claims.

In the accompanying drawing,

Fig. 1 is a view showing in plan one form of welding tongs embodying my invention;

Fig. 2 is a view of the welding tongs in side elevation, partly broken away, and illustrating the closed position of the tongs;

Fig. 3 is a view similar to Fig. 2 and illustrating the tongs gripping an electrode; and Fig. 4 is a sectional view taken on the line 4—4 of Fig. 3.

Referring specifically to the drawing in which similar reference characters designate similar parts in each of the several views, my invention in its present embodiment comprises a pair of jaws J and J' in the present instance constructed of a single length of spring metal bent into substantially the form of a U and normally acting under its inherent resiliency to urge the jaws to closed position wherein the extremities 10 and 10$^a$ of the jaws which constitute electrode gripping portions thereof, are disposed in parallelism and in abutting relation.

The jaws J and J' are adapted to be secured to a handle designated generally at H and comprising a length of tubing of insulating material such as fibre or rubber, within which is secured by means of a screw 11, a socket member 12 having a socket 13 at one end receiving the free uninsulated end of a current conducting cable 14 sweated in the socket to form a perfect electrical connection between the member and cable.

The opposite end of the socket member 12 is provided with a threaded socket 15 receiving a threaded stud 16 having a cylindrical head 17 fitting snugly within an end of the handle and which is welded or otherwise secured to the connected end portion 18 of the jaws J and J', to the end that the jaws will be firmly and detachably secured to the handle in a manner to permit current from the cable 14 to be supplied to the jaws.

To permit the jaws J and J' to be moved to open position for the insertion of an electrode E between the extremities 10 and 10$^a$ of the jaws for gripping of the electrode so that it can be applied to the work to be welded, I provide a manually operable means which in the present instance includes a lever designated generally at L.

The lever L is bifurcated to provide a pair of parallel arms 19 spaced apart sufficiently to freely receive the width of the jaws J and J' therebetween. At one of their ends the arms extend laterally to provide right angularly disposed portions 20, the extremities of which are connected by a transverse portion 21 overlying the jaw J and having secured thereon a pad 22 of insulating material.

At the other of their ends, the arms 19 are pivotally mounted on the jaw J by means of a headed pin 23 extending through registering openings in the arms and in an ear 24 welded or otherwise secured to the jaw J. Adjacent their pivoted end, the arms are provided with registering openings through which extends a pin 26 having rotatably mounted thereon an anti-friction roller 27 disposed in the space between the jaws J and J' and adapted to engage the inner surface of the latter jaw.

In the operation of the welding tongs, and assuming that it is desired to insert an electrode between the extremities 10 and 10$^a$ of the jaws, it will be clear that with the operator grasping the handle H, pressure of the thumb upon the pad 22 will rock the lever L downwardly to cause the roller 27 to have rolling contact with the jaw J' to move the latter away from the jaw J, thus opening the jaws.

The movement of the lever L is continued until the extremities 10 and 10$^a$ have been spread apart sufficiently to insert the electrode, after which the lever L is released, thus permitting the jaws to move towards closed position in response to their normal urging tendency. The electrode will thereby be firmly gripped by the jaws against displacement and will be securely held in the tongs for manipulation by the operator in the presence of the work to be welded.

It will be clear that through the medium of the leverage obtained by the lever L as a result of the manner in which the roller 27 is associated therewith and with the jaw J', that the spring action tending to normally urge the jaws to closed position can be relatively heavy to insure a powerful gripping of an electrode by the jaws, and yet permit the latter to be opened to insert and release the electrode, with but a light pressure of the thumb of the operator upon the pad 22 while conveniently grasping the handle H, thus reducing to a minimum the manual labor necessary to control the jaws.

Although I have herein shown and described only one form of welding tongs embodying my invention, it is to be understood that various changes and modifications may be made therein without departing from the spirit of the invention and the spirit and scope of the appended claims.

I claim:

1. A welding tongs comprising a handle, a pair of relatively movable jaws carried by the handle and normally urged to closed position to grip an electrode therebetween, and manually operable means for opening the jaws comprising a lever pivoted on one of the jaws, and anti-friction means on the lever having rolling engagement with the other of the jaws and operable in response to movement of the lever in one direction to move the last mentioned jaw to open position with respect to the first mentioned jaw.

2. A welding tongs comprising a handle, a pair of relatively movable jaws carried by the handle and normally urged to closed position to grip an electrode therebetween, and manually operable means for opening the jaws comprising a lever pivoted on one of the jaws, a pin carried by the lever, and a roller mounted on the pin and engaging the other of the jaws to move the latter to open position with respect to the first mentioned jaw in response to movement of the lever in one direction.

3. A welding tongs comprising a handle, a pair of relatively movable jaws carried by the handle and normally urged to closed position to grip an electrode therebetween, and manually operable means on one of the jaws having rolling engagement with the other jaws for moving the jaws to open position.

4. A welding tongs comprising a hollow handle of insulating material, a socket member fixed in the handle and to which a conductor extended into the handle is adapted to be electrically connected, a pair of relatively movable jaws normally urged to closed position and having a reduced extension threaded into the socket member to secure the jaws to the handle, a lever pivotally mounted on one of the jaws, a pin carried by the lever, a roller mounted on the pin and engageable with the other jaw to move the latter to open position with respect to the first mentioned jaw in response to movement of the lever in one direction.

5. A welding tongs comprising a hollow handle of insulating material, a socket member fixed in the handle and to which a conductor extended into the handle is adapted to be electrically connected, a pair of relatively movable jaws normally urged to closed position and having a reduced extension threaded into the socket member to secure the jaws to the handle, a bifurcated lever comprising a pair of parallel arms and a portion connecting the arms, the arms extending along opposite sides of the jaws and pivotally connected at their free ends on one of the jaws, a pin carried by the arms and spanning the latter between the jaws, a roller mounted on the pin and engageable with the other of the jaws, and a pad of insulating material on said connecting portion of the lever adapted to be engaged by the thumb of the operator when grasping the handle, to rock the lever and thereby cause said roller to move said other of the jaws to open position with respect to the first mentioned jaw.

6. A welding tongs comprising a tubular handle of insulating material, a socket member fixed in the handle and to which a conductor is adapted to be electrically connected, a pair of resiliently connected jaws normally urged to closed position, a threaded stud on the connected end of the jaws threaded into the socket member to secure the jaws to the handle, and means for opening the jaws comprising a manually operable lever having spaced apart arms extending along opposite sides of the jaws and pivotally connected to one of the jaws, and means on the arms between the jaws, engageable with the other jaw to move the latter to open position with respect to the first mentioned jaw in response to actuation of the lever.

7. A welding tongs comprising a tubular handle of insulating material, a socket member fixed in the handle and to which a conductor is adapted to be electrically connected, a pair of resiliently connected jaws normally urged to closed position, a threaded stud on the connected end of the jaws threaded into the socket member to secure the jaws to the handle, and means for opening the jaws comprising a manually operable lever having spaced apart arms extending along opposite sides of the jaws and pivotally connected to one of the jaws, a pin spanning and mounted in the arms adjacent their pivotal connection with said one jaw so as to be disposed between the jaws, and a roller mounted on the pin and engageable with the other jaw to move the latter to open position with respect to the first mentioned jaw in response to rocking of the lever in one direction.

8. A welding tongs comprising a handle, a pair of relatively movable jaws carried by the handle and normally urged to closed position to grip an electrode therebetween, and manually operable means for opening the jaws comprising a bifurcated lever including a pair of parallel arms and a portion connecting the arms, the arms extending along opposite sides of the jaws and pivotally connected to one of the jaws, a pin mounted in the arms and spanning the latter between the jaws, a roller mounted on the pin and engageable with the other of the jaws, and a thumb piece of insulating material on said connecting portion by which the lever is adapted to be rocked to cause said roller to move said other of the jaws to open position with respect to the first mentioned jaw.

Signed at Los Angeles, in the county of Los Angeles, and State of California, this 7th day of May, A. D. 1928.

ERNEST S. LAWSON.